United States Patent [19]

Shimizu et al.

[11] Patent Number: 4,975,391

[45] Date of Patent: Dec. 4, 1990

[54] ENAMEL FRIT COMPOSITION FOR DIRECT COATING

[75] Inventors: Tadao Shimizu, Tachikawa; Yoshihiro Iizawa, Tokorozawa; Toshiyuki Kasajima, Tokorozawa, all of Japan

[73] Assignee: Ikebukuro Horo Kogyo Co., Ltd., Tokorozawa City, Japan

[21] Appl. No.: 351,851

[22] Filed: May 12, 1989

[30] Foreign Application Priority Data

May 26, 1988 [JP] Japan ................................. 63-127032

[51] Int. Cl.$^5$ ............................. C03C 8/02; C03C 8/12
[52] U.S. Cl. ........................................ 501/21; 501/23; 501/26
[58] Field of Search .................... 501/18, 19, 22, 23, 501/21, 20, 26

[56] References Cited

U.S. PATENT DOCUMENTS 2,660,531  6/1948  Fraser et al. ........................... 501/21

FOREIGN PATENT DOCUMENTS 0199588  11/1984  Japan ..................................... 501/21

*Primary Examiner*—William R. Dixon, Jr.
*Assistant Examiner*—Sue Hollenbeck
*Attorney, Agent, or Firm*—Wenderoth, Lind & Ponack

[57] ABSTRACT

The present invention provides an enamel frit composition which comprises a component selected from the group consisting of $SiO_2$, $B_2O_3$, $Al_2O_3$, CaO, MgO, $Na_2O$, $K_2O$, $Li_2O$, BaO, ZnO, $TiO_2$ and $ZrO_2$, and one or more lanthanoid elements of the atomic numbers of 58 to 60 and 62 to 71 and which enables direct coating without any ground coating.

8 Claims, 1 Drawing Sheet

ENAMEL FRIT COMPOSITION FOR DIRECT COATING

BACKGROUND OF THE INVENTION

The present invention relates to an enamel frit composition used for direct coating of enamel on a base material made of a metal (iron, stainless steel or the like).

Conventional enamel frit compositions for base materials made of metal (iron, stainless steel or the like) contain transition metal elements such as Co, Ni or the like which produce oxidation reactions with the base metals to form Fe-Co alloys or Fe-Ni alloys (dendrite crystal) during firing of the enamel and which adhere closely to the base metals owing to such chemical bonding.

During this firing adhesion process, however, the enamel includes a large amount of gases comprising hydrogen and oxygen gases generated by reaction between the metal and water in the course of firing, carbon dioxide gas generated by oxidation of the carbon present in the metals, and air captured therein. The enamel therefore suffers from the disadvantage of becoming porous.

Such enamel frit compositions are generally used in the form of a ground enamel. Conventional enamel can be obtained by spraying such ground enamel several times and then spraying several cover coatings. Since the need for several sprayings of ground enamel and cover coatings leads to complication of the overall manufacturing process, industry has recently shown a tendency to demand enamel that can be provided directly on a base metal in the form of a frit composition with resistance to chemical corrosion.

In order to obtain an enamel finish by direct coating without using any ground coating, a pretreatment is required in which nickel serving as an adhesive agent or an adhesion accelerator for a base metal is deposited on the surfaces of the base metal. In this pretreatment, a low carbon steel plate to be enamelled is washed with an acid so that the surfaces of the steel plate are strongly corroded by dissolving out 25 g/m$^2$ or more of the iron on the surfaces of the steel plate, and 0.6 to 1.5 g/m$^2$ of nickel is then deposited on those surfaces by using nickel treatment.

Such pretreatment with a nickel metal enables enamelling having a relatively good level of adhesion to be obtained by directly spraying a cover coating, without spraying any ground coating. The enamels obtained by this method, however, do not have a level of adhesion sufficient to allow them to be used in reaction vessels or the like which are used under harsh conditions.

In order to reduce the viscosity of an enamel during firing, direct ground coatings generally contain small amounts of an SiO$_2$ component and large amounts of R$_2$O (wherein R denotes an alkali metal such as Na, K, Li or the like) and B$_2$O$_3$, as well as an element such as Co, Ni, Mn or the like. The ground coatings therefore have the disadvantage that they have substantially no resistance to chemical corrosion owing to the nature of their composition.

Accordingly, it is an object of the present invention to provide an enamel frit composition used for direct coating which possesses none of the above-described disadvantages.

SUMMARY OF THE INVENTION

The present invention provides an enamel frit composition used for direct coating comprising an enamel frit composition selected from the group consisting of SiO$_2$, B$_2$O$_3$, Al$_2$O$_3$, CaO, MgO, Na$_2$O, K$_2$O, Li$_2$O, BaO, ZnO, TiO$_2$ and ZrO$_2$, and one or more additional lanthanoid elements of the atomic numbers of 58 to 60 and 62 to 71.

The present invention further provides an enamel frit composition used for direct coating comprising an enamel frit composition selected from the group consisting of SiO$_2$, B$_2$O$_3$, Al$_2$O$_3$, CaO, MgO, Na$_2$O, K$_2$O, Li$_2$O, BaO, ZnO, TiO$_2$ and ZrO$_2$, one or more additional lanthanoid elements of the atomic numbers of 58 to 60 and 62 to 71, and at least one element selected from the transition metal elements comprising Fe, Co and Ni and the group consisting of Mn and Y.

In the figure, numeral 1 is an enamelled sample, numeral 2 is a handle, numeral 3 is a steel ball and numeral 4 is a female mold.

Figure 2:
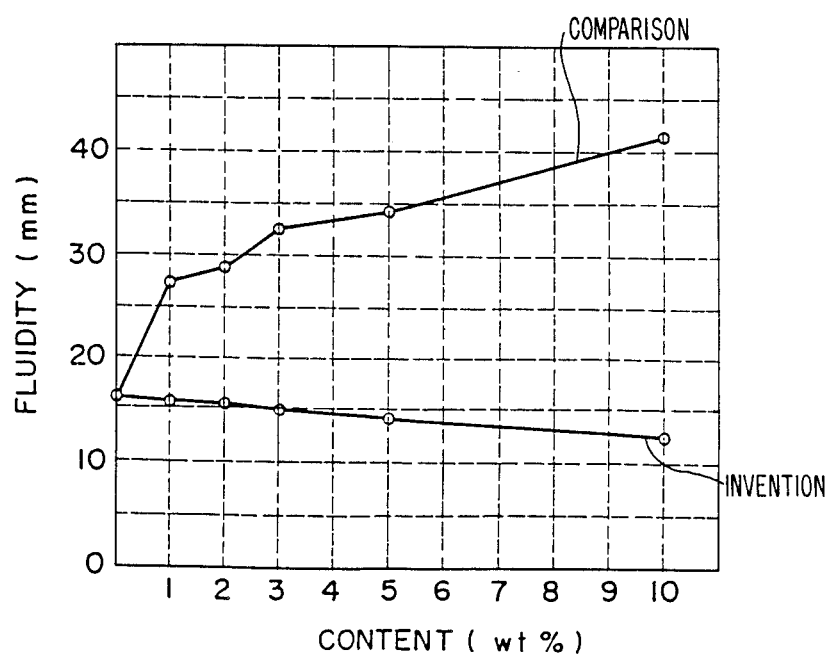

FIG. 2 is a graph provided for explaining the results obtained from examples of the present invention.

DETAILED DESCRIPTION OF THE INVENTION

The adhesion of an enamel frit composition used for direct coating of the present invention is improved by addition of lanthanoid elements thereto. Observation of the portion where an enamel adheres to a metal surface by means of an electron microscope showed that the dendrite crystals growing from a base metal are large, long and have a very sharp form. It is estimated from this finding that such dendrite crystals significantly contribute to improvements in the degree of adhesion. Such improvements in the adhesion enable the achievement of satisfactory adhesive strength by direct coating without any need for applying a cover coating after the ground coating has been provided, as in conventional enamelling. This leads to the achievement of a reduction in the final thickness of the enamel and inevitably provides an increase in the mechanical and thermal impact strength.

Examples of lanthanoid elements that may be used in the direct coating enamel frit composition of the present invention include one or more elements selected from the group consisting of Ce, Pr, Nd, Sm, Eu, Gd, Tb, Dy, Ho, Er, Tm, Yb and Lu. Of these elements, Sm (atomic number 62) and Er (atomic number 68) provide particularly strong effects.

The amount of the lanthanoid element (Ce, Pr, Nd, Sm, Eu, Gd, Tb, Dy, Ho, Er, Tm, Yb or Lu) to be mixed with an enamel frit composition of a type that is generally used is 0.01 to 20 parts by weight, preferably 1 to 10 parts by weight, more preferably 3 to 5 parts by weight, in terms of the corresponding oxide relative to 100 parts by weight of the enamel frit composition. Mixing in an amount of less than 0.01 parts by weight brings about no improvement in the adhesion and is thus undesirable, while mixing in an amount of over 20 parts by weight is also undesirable because it causes an increase in the melting point of the enamel frit composition obtained, and thus prevents it from being easily melted at the temperatures usually used in enamel production, i.e., 1200° to 1300° C., as well as presenting the disadvantage that it will crystallize after being fritted.

In the direct coating enamel composition of the present invention, the adhesion of the enamel is remarkably improved by mixing one or more of the above-described lanthanoid elements and one or more elements selected from the transition elements such as Fe, Co and Ni and the group consisting of Mn and Y. It is assumed that this is because the latter elements function to provide an intermediate between the lanthanoid elements and the base metal.

Preferable combinations that exhibit significant effects include a combination of Sm or Er and Co or Ni, more preferable combinations are those of Sm and Co or Er and Co, and the most preferable combination is that of Sm and Co.

The proportion of at least one element selected from the group consisting of Mn, Fe, Co, Ni and Y is 0.2 to 1.5 parts by weight in terms of the corresponding oxide relative to 100 parts by weight of the enamel frit composition. As a proportion of less than 0.2 parts by weight has no effect, it is undesirable, while a proportion of over 1.5 parts by weight leads to the generation of blistering and is also undesirable. Also, since the addition of a total proportion of over 3 parts by weight of the elements causes blistering, the total proportion is preferably less than 3 parts by weight.

At least one element selected from the group consisting of Mn, Fe, Co, Ni and Y may or may not be mixed in with the above-described enamel frit composition of the type that is commonly used, and the lanthanoid elements in the form of oxides are added to the mixture and mixed therewith, whereby a direct coating enamel frit composition maintaining such enamel characteristics as resistance to corrosion, good adhesion and so on can be easily produced by using a conventional electric furnace.

The common enamel frit composition used in the present invention is not particularly limited so long as it comprises a component selected from the group consisting of $SiO_2$, $B_2O_3$, $Al_2O_3$, CaO, MgO, $Na_2O$, $K_2O$, $Li_2O$, BaO, ZnO, $TiO_2$, $ZrO_2$, SbO, PbO, $F_2$ and the like, and any suitable composition may be used.

The direct coating enamel frit composition of the present invention enables the achievement of enamelling having exblisterent characteristics by spraying one or more times using commonly used direct methods, without using any ground coating under the same conditions as those employed conventionally for spraying enamels on base metals.

EXAMPLES

The direct coating enamel frit composition of the present invention is described below with reference to examples.

EXAMPLE 1

The compositions of the ground coating and cover coating used in the examples and comparative examples are shown in Table 1.

TABLE 1

| | (unit: mol %) | | |
| --- | --- | --- | --- |
| | Ground coating | Cover coating | |
| | B | A | B |
| $SiO_2$ + $TiO_2$ + $ZrO_2$ | 55 | 73 | 75 |
| $R_2O$ ($Na_2O$ + $K_2O$ + $Li_2O$) | 21 | 17 | 16 |

TABLE 1-continued

| | (unit: mol %) | | |
| --- | --- | --- | --- |
| | Ground coating | Cover coating | |
| | B | A | B |
| R'O (CaO + BaO + MgO + ZnO + SbO + PbO) | 6 | 5 | 6 |
| $B_2O_3$ + $Al_2O_3$ | 15.5 | 4 | 3 |
| CoO + NiO + $MnO_2$ | 2.5 | 1.0 | — |

5 parts by weight of one of the oxides of the lanthanoid elements (Ce, Pr, Nd, Sm, Eu, Gd, Tb, Dy, Ho, Er, Tm, Yb and Lu) was mixed with 100 parts by weight of frit powder having the cover coating composition B shown in Table 1. The thus-formed mixture was then melted at 1200° C. for 2 hours, and then quenched in water to form a direct coating enamel frit composition of the present invention containing the lanthanoid elements.

The thus-obtained composition was then ground by a ball mill to prepare a powder having a grain size of 5 g/200 mesh/50 g.

Each of the frit composition powders of the examples and comparative examples (ground coating B, cover coatings A and B) were then sieve-coated on a thin steel plate for enamelling having a size of 80 mm×100 mm×1 mm in a dry manner using a 80 mesh sieve so as to have a glass thickness of 0.3 mm respectively. After the thus-coated plate was fired at 840° C. for 10 minutes, it was subjected to an Ericksen test using the apparatus shown in FIG. 1 in accordance with the method described below for the purpose of testing the adhesion of the enamels which were deep-deformed to a depth of 3 mm. The results obtained are shown in Table 2.

Ericksen test

Figure 1:
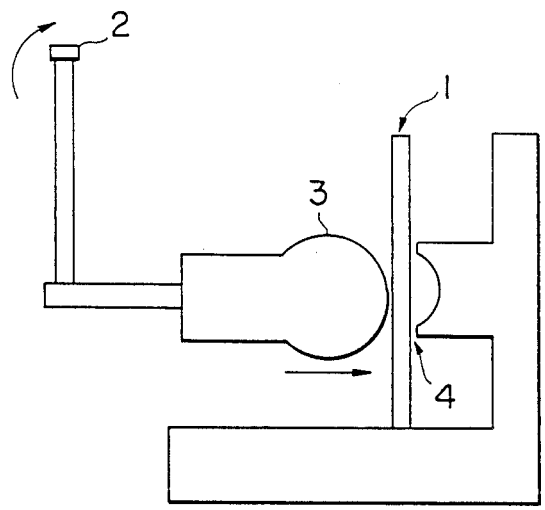
FIG. 1 is an explanatory view of an apparatus which is used in an Ericksen test.

Each of the enamelled samples (1) was erected, as shown in FIG. 1, and then deformed to a depth of about 3 mm between a female mold of 30 mm φ and a steel ball (3) of 40 mm φ which was put into pressure contact with each of the samples by turning a screw-type handle (2). The separated state of each enamel sample was observed.

As can be seen from the results shown in Table 2, all of the samples of the present invention which contain one of the lanthanoid elements exhibited excellent adhesion, as compared with the ground coating B and the cover coatings A and B of the comparative samples. In particular, the samples respectively containing the oxides of Nd and Gd had glass layers which completely remained in the base metals, and exhibited significantly good results as well.

The enamel surface of each of the enamelled samples of the present invention and the comparative samples was then observed by using a scanning electron microscope (×100, ×500) for the purpose of testing the blister properties by examining the state wherein blisters occur in a unit area (4 mm²) of the enamel surface using the following ranges of brister diameters:

100 μm diameter
100 to 150 μm diameter
150 to 300 μm diameter
300 to 500 μm diameter The results obtained are shown in Table 2.

As can be seen from Table 2, each of the samples of the present invention had bristers numbering less than in the comparative samples. In particular, since no occurrence of blisters having diameters of 100 μm or more was observed in any of the samples respectively containing the oxides of Pr, Nd, Sm, Gd and Er, these samples were significantly dense.

TABLE 2

|  | Sample of This Invention Oxides of Lanthanoids | | | | | | | | | | | | | Comparative Sample | | |
|---|---|---|---|---|---|---|---|---|---|---|---|---|---|---|---|---|
|  | | | | | | | | | | | | | | Ground Coating B | Cover Coating A | Cover Coating B |
|  | Ce | Pr | Nd | Sm | Eu | Gd | Tb | Dy | Ho | Er | Tm | Yb | Lu | | | |
| Adhesion | ○ | ○ | ◉ | ◉ | ○ | ○ | ○ | ○ | ○ | ◉ | ○ | ○ | ○ | Δ | X | X |
| Blister | ○ | ◉ | ◉ | ◉ | ○ | ◉ | ○ | ○ | ○ | ◉ | ○ | ○ | ○ | X | X | X |

Note:
Adhesion ◉: The glass layer completely remained on the base metal, with good results.
○: Half or more of the glass layer remained, with good results.
Δ: One third or more of the glass layer remained.
X: The glass layer was completely separated from the base metal.
Blister ◉ : No blisters with diameters of 100 μm or more were present in the surface of any enamelled sample, with good results.
○: Blisters with diameters of 100 to 150 μm were present in the surface layer of each enamelled sample, with good results
Δ: Blisters with diameters of 150 to 300 μm were present in the surface layer of each enamelled sample.
X: Blisters with diameters of 300 to 500 μm were present in the surface layer of each enamelled sample.

EXAMPLE 2

In order to examine the effect of the proportion of the lanthanoid element mixed and the effect of addition of Y, Fe, Co, Ni or Mn, samples of the direct coating enamel frit composition of the present invention were prepared by using various proportions of $Nd_2O_3$ relative to 100 parts by weight of the frit powder having the cover coating B shown in Table 1 and using the ingredients in the proportions shown in Table 3 by the same method as employed in Example 1.

Samples of enamel were produced by the same method as that employed in Example 1 and then measured with respect to their adhesion and blister properties by the same method as that employed in Example 1. The results obtained are shown in Table 3.

TABLE 3

| | (Unit: parts by weight) Samples of This Invention | | | | | | |
|---|---|---|---|---|---|---|---|
| | 1 | 2 | 3 | 4 | 5 | 6 | 7 |
| $Nd_2O_3$ | 0.01 | 0.1 | 1.0 | 3.0 | 5.0 | 10 | 20 |
| $Y_2O_3$ | | | | 1.0 | | | |
| $Fe_2O_3$ | | | 1.0 | | | | |
| CoO | 1.0 | | | | 1.0 | | |
| NiO | | 1.0 | | | | | 0.5 |
| $MnO_2$ | | | | | | 1.0 | 1.0 |
| Adhesion | ○ | ○ | ◉ | ◉ | ◉ | ○ | ○ |
| Blister properties | ○ | ○ | ◉ | ◉ | ◉ | ○ | ○ |

The criteria for the evaluation with respect to the adhesion and blister properties were the same as those described in Table 2.

As can be seen from Table 3, all the samples of the present invention containing 0.01 to 20 parts by weight of $Nd_2O_3$ exhibit exblisterent performance. In particular, the samples containing 1.0 to 5 parts by weight of $Nd_2O_3$ have no blister having diameters of 100 μm or more and the glass layer which completely remains on the base metal, as well as exhibiting very exblisterent adhesion.

EXAMPLE 3

In order to examine the effect of the addition of lanthanoid elements and Co or Ni, samples of the direct coating enamel frit composition of the present invention were prepared by using various proportions of $Sm_2O_3$ relative to 100 parts by weight of the frit powder of the cover coating B shown in Table 1 and using the ingredients in the proportions shown in Table 4 by the same method as employed in Example 1.

Enamels were produced by the same method as employed in Example 1 and then measured with respect to their adhesion and blister properties by the same method as employed in Example 1. The results obtained are shown in Table 4.

TABLE 4

| | (Unit: parts by weight) Samples of This Invention | | | | | | |
|---|---|---|---|---|---|---|---|
| | 1 | 2 | 3 | 4 | 5 | 6 | 7 |
| $Sm_2O_3$ | 0.01 | 1.0 | 3.0 | 5.0 | 5.0 | 10 | 20 |
| CoO | 1.0 | | 1.0 | 1.0 | | 1.5 | |
| NiO | | 1.0 | | | 1.0 | | 0.2 |
| Adhesion | ○ | ○ | ◉ | ◉ | ◉ | ◉ | ○ |
| Blister properties | ○ | ○ | ◉ | ◉ | ◉ | ○ | ○ |

The criteria for the evaluation of adhesion and blister properties were the same as those described in Table 2.

EXAMPLE 4

In order to examine the effect of the addition of lanthanoid elements and Co or Ni, samples of the direct coating enamel frit composition of the present invention were prepared by using various proportions of $Er_2O_3$ relative to 100 parts by weight of the frit powder of the cover coating B shown in Table 1 and using the ingredients in the proportions shown in Table 4 by the same method as employed in Example 1.

Enamels were produced by the same method as that employed in Example 1 and then measured with respect to its adhesion and blister properties by the same method as that employed in Example 1. The results obtained are shown in Table 5.

TABLE 5

| | (Unit: parts by weight) Samples of This Invention | | | | | | |
|---|---|---|---|---|---|---|---|
| | 1 | 2 | 3 | 4 | 5 | 6 | 7 |
| $Er_2O_3$ | 0.01 | 1.0 | 3.0 | 5.0 | 5.0 | 10 | 20 |
| CoO | 1.0 | | 1.0 | 1.0 | | 1.5 | |
| NiO | | 1.0 | | | 1.0 | | 0.2 |
| Adhesion | ○ | ○ | ◉ | ◉ | ◉ | ◉ | ○ |
| Blister properties | ○ | ○ | ◉ | ◉ | ◉ | ○ | ○ |

The criteria for the evaluation of adhesion and blister properties were the same as those described in Table 2.

EXAMPLE 5

Comparative samples each of which respectively contained 1 part by weight, 2 parts by weight, 3 parts by weight, 5 parts by weight and 10 parts by weight of CoO relative to 100 parts by weight of the frit powder of the cover coating B shown in Table 1 were prepared, and samples of the present invention each of which respectively contained 1 part by weight, 2 parts by weight, 3 parts by weight, 5 parts by weight and 10 parts by weight of $Gd_2O_3$ relative to 100 parts by weight of the frit powder of the cover coating B shown in Table 1 were prepared. 2 g of each of the five kinds of comparative samples was placed on a 80 mm × 100 mm × 1 mm thin plate used for enamelling and 2 g of each of the five kinds of samples of the present invention were placed on another steel plate of the same size to form a button-like shape having a diameter of 12 mm and a height of 14 to 15 mm. Each of the steel plates was then heated at 870° C. for 20 minutes for the purpose of testing the fluidity of each of the samples. The fluidity was determined by measuring the diameter of each of the resulting button-like shapes. The results obtained are shown in FIG. 2.

It is found from FIG. 2 that, since the samples of the present invention are capable of controlling a blistering phenomenon in proportion to an increase in the amount of $Gd_2O_3$ added, the fluidity decreases with an increase in the amount.

It is also found that, in the comparative sample containing CoO alone, since the blistering phenomenon increases as the amount of CoO added increases, the fluidity thereof is increased depending upon the amount of CoO added.

Further, each of comparative samples respectively containing 3 parts by weight, 5 parts by weight and 10 parts by weight of CoO produced many blisters by heating to be deformed in such a manner that the button-like shape was not maintained. However, the diameters of the button-like shapes were measured assuming that the samples have a button-like shape.

What is claimed is:

1. In a vitreous enamel frit composition for coating an iron or stainless steel substrate, said composition consisting essentially of:
   (a) at least one of $SiO_2$, $TiO_2$ and $ZrO_2$
   (b) at least one of $Na_2O$, $K_2O$ and $Li_2O$
   (c) at least one of CaO, BaO, MgO, ZnO, SbO and PbO and
   (d) at least one of $B_2O_3$ and $Al_2O_3$, the improvement which comprises including in said composition a lanthanoid oxide at 0.01-20 parts by weight per 100 parts by weight of said composition, whereby said composition when directly coated on the surface of said substrate and fired thereon promotes the formation of dendritic crystals at the interface of said coated composition and substrate, thereby improving adhesion of said fired composition to said substrate.

2. The composition according to claim 1 further containing at least one oxide selected from a group consisting of oxides Fe, Co, Ni, Mn and Y in the amount less than 3 parts by weight relative to 100 parts by weight of said frit composition.

3. The composition according to claim 1 wherein weight parts of each oxide of Fe, Co, Ni, Mn, or Y is 0.2 to 1.5 relative to 100 parts by weight of said frit composition.

4. The composition according to claim 2 or 3 wherein the lanthanoid element is at least one of Sm and Er.

5. The composition according to claim 3 wherein at least one of Ni and Co is included.

6. The composition according to claim 4 containing Sm and Co.

7. The composition according to claim 4 containing Er and Co.

8. The composition according to claim 1 wherein (a) is present at 75 mol %, (b) is present at 16 mol %, (c) is present at 6 mol %, (d) is present at 3 mol % and said composition additionally contains samarium oxide at 5 parts by weight relative to the total weight of said (a), (b), (c) and (d).

* * * * *